United States Patent
Peercy et al.

(10) Patent No.: US 6,587,114 B1
(45) Date of Patent: Jul. 1, 2003

(54) METHOD, SYSTEM, AND COMPUTER PROGRAM PRODUCT FOR GENERATING SPATIALLY VARYING EFFECTS IN A DIGITAL IMAGE

(75) Inventors: Mark S. Peercy, Cupertino, CA (US); Daniel D. Loh, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,345

(22) Filed: Dec. 15, 1999

(51) Int. Cl.[7] ................................................. G09G 5/00
(52) U.S. Cl. ...................................................... 345/582
(58) Field of Search ................................ 345/419, 581, 345/582, 587, 589, 606, 647, 545, 583; 382/260, 264, 279

(56) References Cited

U.S. PATENT DOCUMENTS

| | | | | |
|---|---|---|---|---|
| 5,222,205 A | * | 6/1993 | Larson et al. ................ | 345/587 |
| 5,872,867 A | * | 2/1999 | Bergen ......................... | 348/571 |
| 5,943,058 A | * | 8/1999 | Nagy ........................... | 345/582 |

OTHER PUBLICATIONS

Angel, E. "Interactive Computer Graphics: A Top–Down Approach with OpenGl™,"Addison–Wesley Publishing Co., Reading, Mass., 1997, title page, table of contents, and pp. 420–423.

Foley et al., "Computer Graphics Principles and Practice," Addison–Wesley Publishing Co., Reading, Mass., $2^{nd}$ edition, 1996, title page, table of contents, and pp. 614–615, 774–775, and 789.

Gonzalez et al., "Digital Image Processing," Addison–Wesley Publishing Co., Reading, Mass., $2^{nd}$ edition, 1987, title page, table of contents and pp. 161–175.

Haeberli et al., "The Accumulation Buffer: Hardware Support for High–Quality Rendering," in *Computer Graphics* (*Proceedings of SIGGRAPH 90*), vol. 24, No. 4, Aug. 1990, pp. 309–318.

Korein et al., "Temporal Anti–Aliasing in Computer Generated Animation," in *Computer Graphics* (*Proceedings of SIGGRAPH 83*), vol. 17, No. 3, Jul. 1983, pp. 377–388.

Potmesil et al., "Modeling Motion Blur in Computer–Generated Images," in *Computer Graphics* (*Proceedings of SIGGRAPH 83*), vol. 17, No. 3, Jul. 1983, pp. 389–399.

Potmesil et al., "Synthetic Image Generation with a Lens and Aperture Camera Model," in *ACM Transactions on Graphics*, vol. 1, No. 2, Apr. 1982, pp. 85–108.

Strauss et al., "An Object–Oriented 3D Graphics Toolkit," in *Computer Graphics*, vol. 26, No. 2, Jul. 1992, pp. 341–349.

Woo et al., "OpenGL Programming Guide," Addison–Wesley Longman, Inc., Reading, Mass., $3^{rd}$ edition, 1999, title page, table of contents and pp. 450–465.

* cited by examiner

*Primary Examiner*—Matthew Luu
*Assistant Examiner*—Faranak Fouladi
(74) *Attorney, Agent, or Firm*—Woodcock Washburn LLP

(57) ABSTRACT

The present invention provides a method, system, and computer program product for generating a digital image having spatially varying effects. A preexisting source image is selected and used to generate a three-dimensional texture volume by convolving the pixels of the selected source image with a predetermined convolution kernel. A display image having spatially varying effects is then generated using the pixels of the three-dimensional texture volume and the pixels of a reference image, where each pixel of the reference image acts as an index to the pixels of the three-dimensional texture volume. The display image may be generated by either copying pixels from the three-dimensional texture volume to a frame buffer or by blending pixels from the three-dimensional texture volume with the pixels of an image already stored in the frame buffer.

20 Claims, 7 Drawing Sheets

METHOD, SYSTEM, AND COMPUTER PROGRAM PRODUCT FOR GENERATING SPATIALLY VARYING EFFECTS IN A DIGITAL IMAGE

BACKGROUND OF THE INVENTION

1. Field of the Invention

The present invention relates to computer graphics. More particularly, it relates to generating a digital image having spatially varying effects.

2. Related Art

In computer graphics, spatially varying effects such as blurring are important effects that contribute to the overall realism of digital images. Blurring adds to the realism of digital images because only one plane in a real image, the focal plane, can be in focus at any given instance in time. The farther an object is located from the focal plane in a real image, the more out of focus or blurry it is. Blurring also adds to the realism of a sequence of digital images. Motion-blurred objects in a sequence of digital images appear to be moving to an observer of the sequence. Being able to quickly generate a sequence of digital images having spatially varying effects is particularly important, especially in computer animation.

Conventionally, digital images having spatially varying effects, such as blurring, have been generated by combining several copies of an object to be blurred into a single image. For example, a stationary object in a digital image can be blurred to simulate focal plane effects by generating several slightly displaced copies of the object and blending the pixels of these copies of the object to form a single blurred image of the object. Similarly, motion-burring can be simulated in a digital image by generating several copies of an object to be motion-blurred and blending the pixels of the copies of the object with the pixels of a digital image scene. In this case, each copy of the object to be motion-blurred is slightly displaced from the other copies of the object along a particular path of motion.

While known methods for simulating spatially varying effects in digital images are useful in certain circumstances, these known methods cannot be implemented at interactive rates on graphics machines. Known methods for simulating spatially varying effects in digital images are highly dependent on scene complexity and geometric complexity. Rendering a complex digital image for screen display typically requires multiple passes through a graphics pipeline. Each pass through a graphics pipeline takes a finite amount of time. The time required to render any digital image for screen display also generally increases with the complexity of the image. Because known methods for generating digital images having spatially varying effects are highly dependent on image complexity, i.e, these methods render several copies of each image to be blurred, these known methods cannot be implemented on interactive graphics machines.

What is needed is a method, system, and computer program product for generating digital images having spatially varying effects that can be implemented at an interactive rate on a graphics machine.

SUMMARY OF THE INVENTION

The present invention provides a method, system, and computer program product for generating a digital image having spatially varying effects. In one embodiment, a preexisting source image is selected and used to generate a three-dimensional texture volume by convolving the pixels of the selected source image with a predetermined convolution kernel. A display image having spatially varying effects is then generated using the pixels of the three-dimensional texture volume and the pixels of a reference image, where each pixel of the reference image acts as an index to the pixels of the three-dimensional texture volume. The display image may be generated by either copying pixels from the three-dimensional texture volume to a frame buffer or by blending pixels from the three-dimensional texture volume with the pixels of an image already stored in the frame buffer.

In an embodiment of the present invention, the image planes of the three-dimensional texture volume are generated by convolving the pixels of the source image with a box-type filter. In another embodiment, the image planes of the three-dimensional texture volume are generated by convolving the pixels of the source image with a Gaussian-type filter. Image planes of the three-dimensional texture volume can also be generated using an image plane of the three-dimensional texture volume itself.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art(s) to make and use the invention.

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention provides a method, system, and computer program product for generating digital images having spatially varying effects. As used herein, the term digital image or image means an array of pixels. The term pixel means a data structure, which is used to represent a picture element.

The term "interactive rate" refers to a rate at which successive display images can be redrawn without undue delay upon a user or application. This interactive rate can include, but is not limited to, a rate equal to or less than approximately 120 milliseconds. In one preferred example, an interactive rate is equal to or less than 60 milliseconds.

Example Environment

Figure 1:
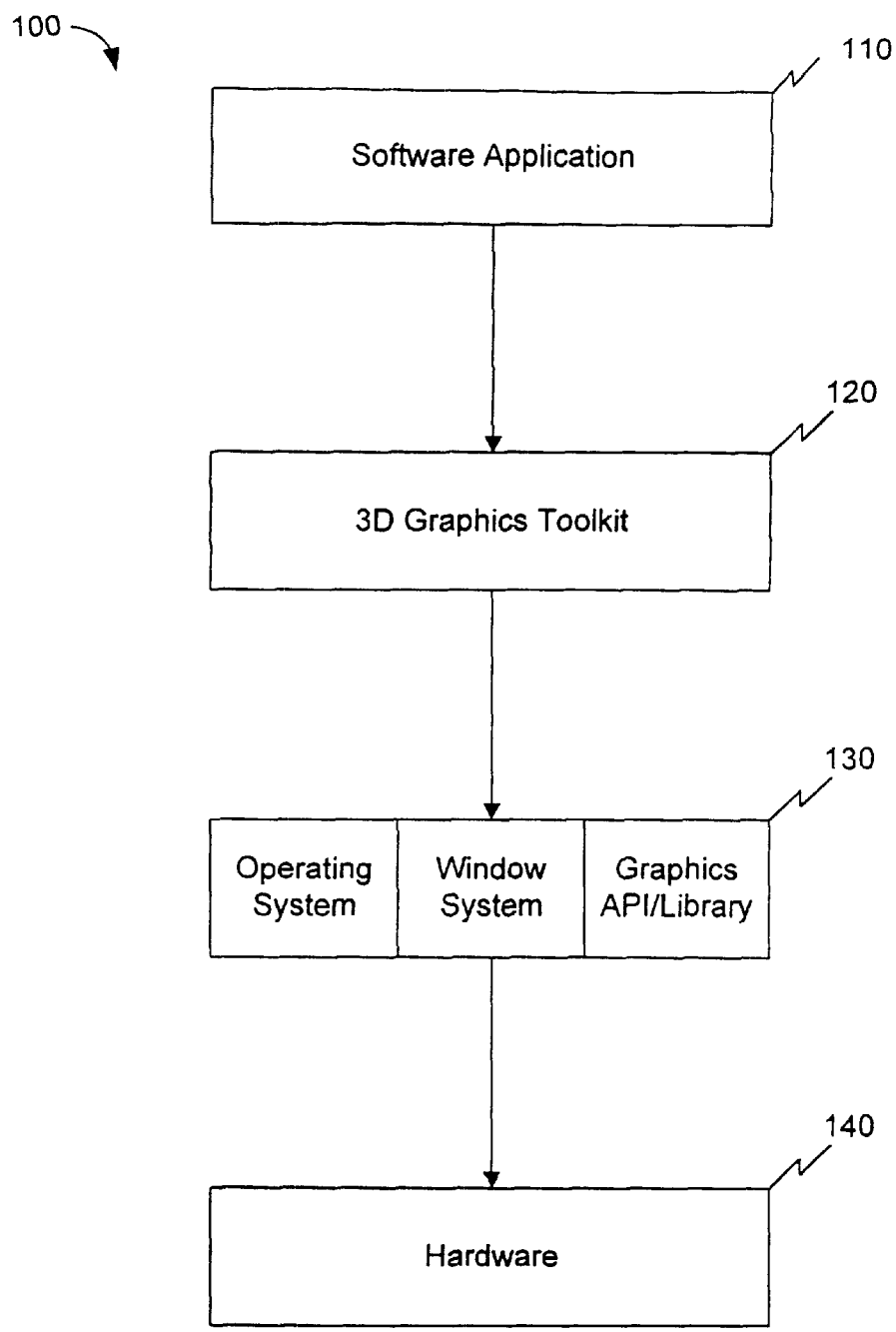
FIG. 1 is a block diagram of an example computer graphics architecture in which the present invention can be implemented.

It is a feature of the present invention that it may be implemented in many different ways in many different computers or computer-like environments. For example, FIG. 1 shows a block diagram of a computer graphics architecture 100 in which the present invention can be implemented. As would be apparent to a person skilled in the relevant art(s), the present invention can be implemented in any one of the layers 110–140 of architecture 100, or in any combination of layers 110–140 of architecture 100.

Architecture 100 includes four layers. Layer 110 represents a high level software application. Layer 120 represents a three-dimensional (3D) graphics software tool kit, such as Open Inventor™. For an explanation of what a 3D graphics tool kit is and how it is used, see Strauss et al., An Object-Oriented 3D graphics Tool Kit, Computer Graphics, 26(2) July 1992, pp. 341–349, incorporated in its entirety herein by reference. Layer 130 represents a graphics API, which can include but is not limited to OpenGL™, and/or other system support such as operating system support. Finally, layer 140 represents hardware, including graphics hardware. Hardware 140 can be any hardware, graphics hardware or graphics pipeline including, but not limited to, a computer graphics processor (single chip or multiple chip), a specially designed computer, an interactive graphics machine, a gaming platform, system, or console, a network architecture, et cetera. Some or all of these layers will be available in any interactive graphics machine.

A book that specifically focuses on programming details is Woo et al., *OpenGL™ Programming Guide* (Addison Wesley Longman, Inc.: Reading, Mass. 3$^{rd}$ ed. 1999), incorporated in its entirety herein by reference. See also Foley et al., *Computer Graphics Principles and Practices* (Addison Wesley Publishing Co.: Reading, Mass. 2$^{nd}$ ed. 1996), incorporated in its entirety herein by reference, and Angel, *Interactive Computer Graphics: A Top-Down Approach With OpenGL™* (Addison Wesley Publishing Co.: Reading, Mass. 1997), also incorporated in its entirety herein by reference.

Figure 2:
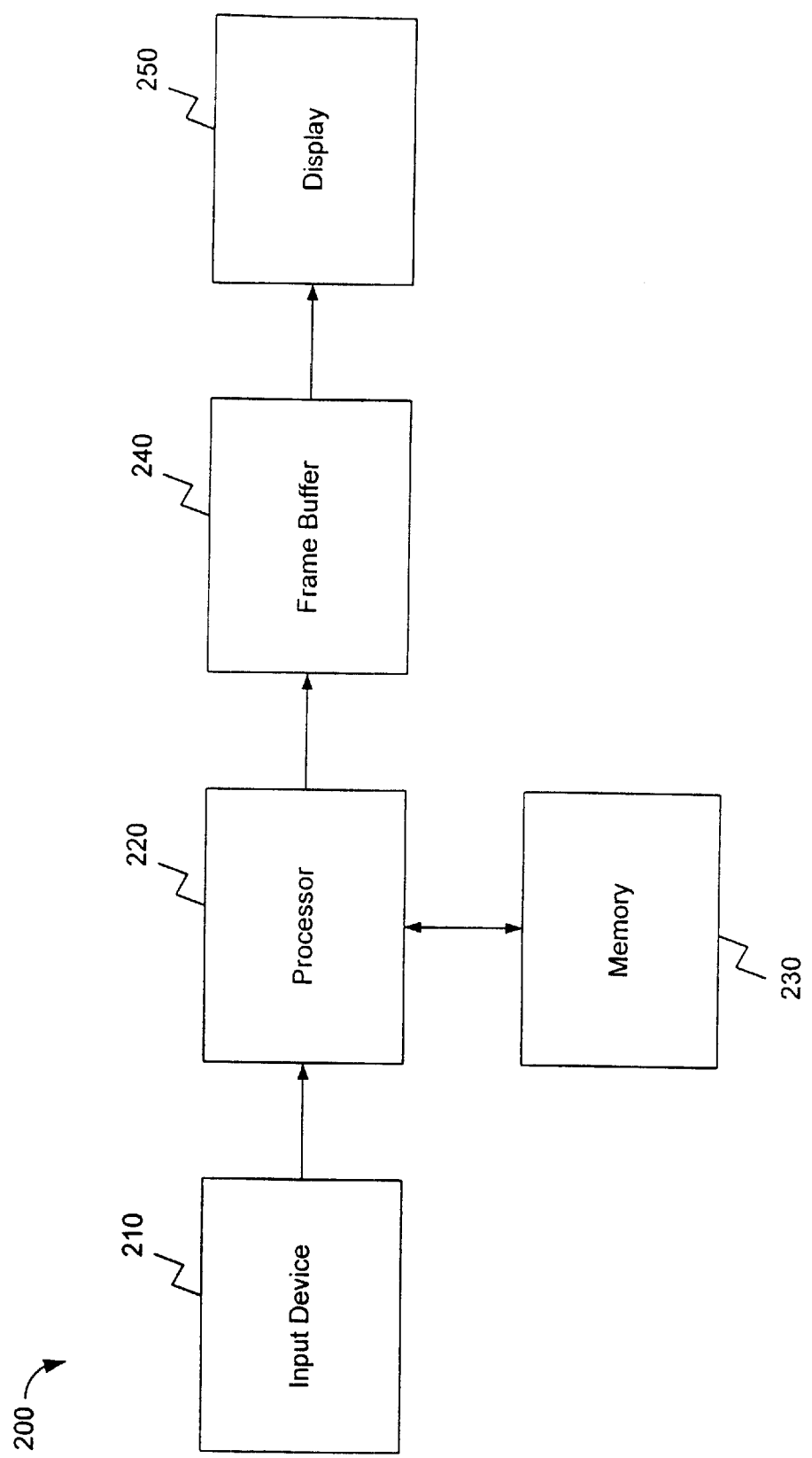
FIG. 2 is a block diagram of an example interactive graphics machine.

FIG. 2 is a block diagram of an interactive graphics machine 200, which may be used to generate digital images having spatially varying effects according to a method 300 of the present invention. Interactive graphics machine 200 includes features 210–250. Input device 210 represents one or more input devices that allow a user to interact with interactive graphics machine 200. Input device 210 represents devices such as a keyboard, a mouse, a joystick, et cetera. Processor 220 represents any processor (single chip or multiple chip). Memory 230 represents any memory, for example, processor or main memory, memory disks, network memory, et cetera. Frame buffer 240 represent any memory used to store the pixels of a digital image for display by the display hardware. Frame buffer 240 can be memory located on a display card (not shown) or it can be a portion of processor memory (not show). Finally, display 250 represents display hardware and any display capable of displaying a digital image, or a series of digital images, to a user. For a more detailed explanation of each of these features and how they interrelate, see Foley et .al., Chapter 4, "Graphics Hardware," pages 145–199.

Generating a Digital Image Having Spatially Varying Effects

Figure 3:
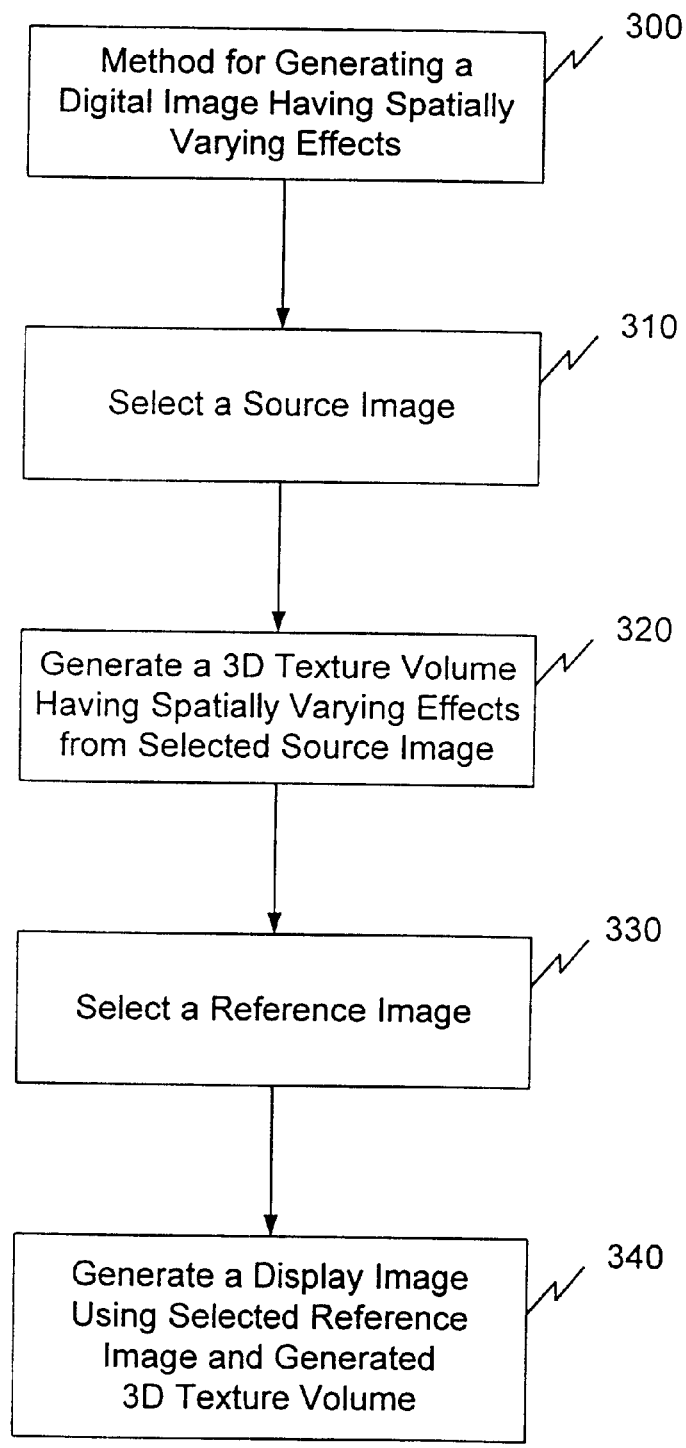
FIG. 3 is a flowchart illustrating the steps of the present invention.

FIG. 3 illustrates a method for generating a digital image having spatially varying effects 300 according to one embodiment of the present invention. Method 300 comprises steps 310–340.

In step 310, a source image is selected. A source image is any preexisting image. The source image selected in step 310 can reside in any one of several different locations. For example, the selected source image can reside in memory 230 or frame buffer 240.

Figure 4:
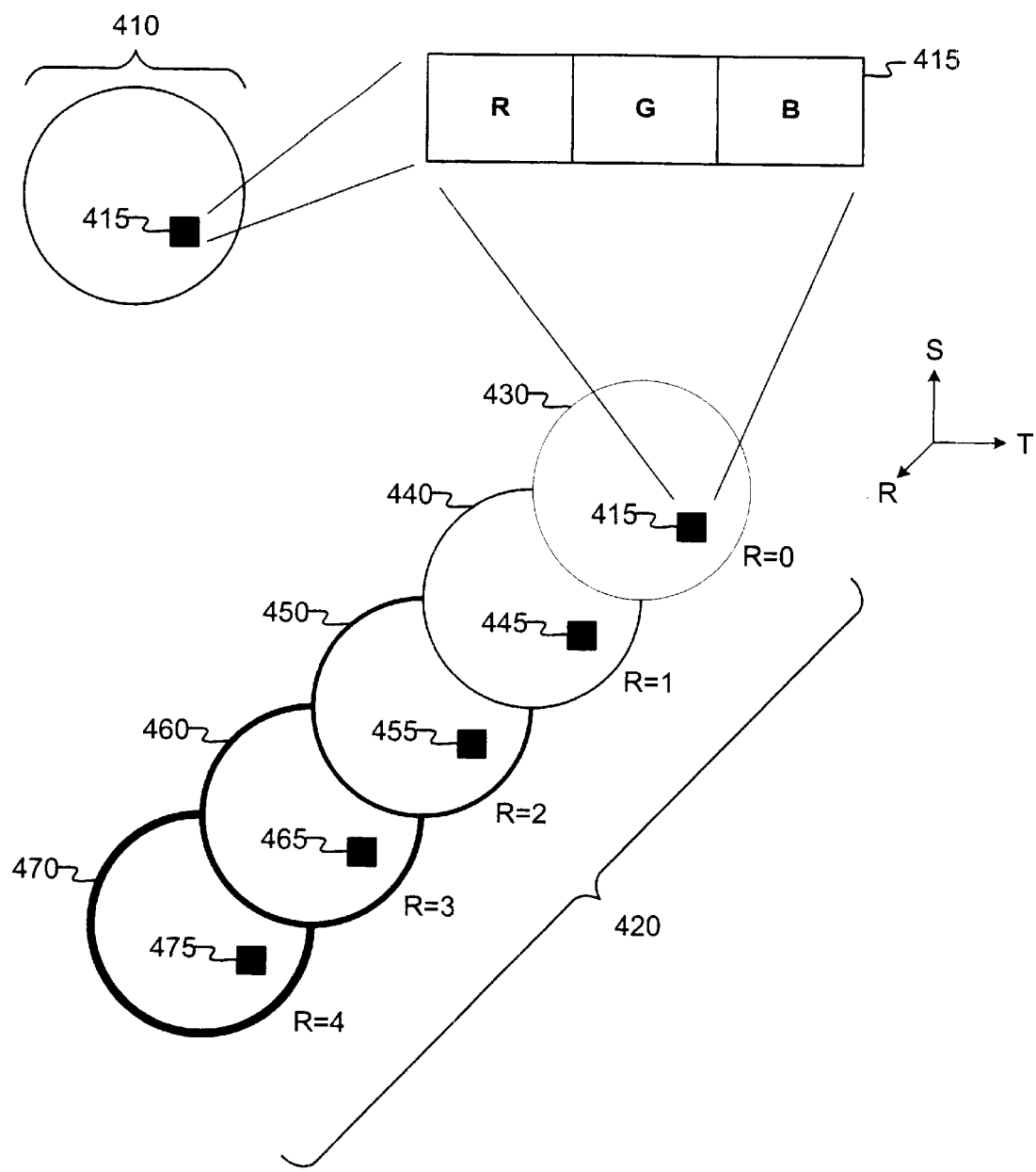
FIG. 4 is a diagram illustrating the relationship between a source image and a three-dimensional texture volume of the present invention.

In step 320, a 3D texture volume is generated using the source image selected in step 310. FIG. 4 illustrates the relationship between a selected source image 410 and 3D texture volume 420 generated according to one example of the present invention.

As can be seen in FIG. 4, source image 410 has a plurality of pixels, such as pixel 415. Pixel 415 includes color data, such as red, green, and blue. The present invention is not so limited, however, as other colors can be used. Also, the source image 410 is shown as a circle, however, in general, any shape can be used.

3D texture volume 420 is generated from source image 410 by operating on source image 410 using one or more filters as further described below. As can be seen in FIG. 4, 3D texture volume 420 has five image planes 430–470. Each successive image plane of 3D texture volume 420 is a blurrier copy of source image 410 than is its preceding image plane. For example, image plane 460 is a blurrier copy of source image 410 than is image plane 450, and image plane 450 is a blurrier copy of source image 410 than is image plane 440. Image plane 470 is the blurriest copy of source image 410 contained in 3D texture volume 420.

Each image plane 430–470 is a two-dimensional array of pixels that is stored in a particular R plane of an S, T, and R coordinate system. The location of any pixel in a particular image plane can be specified by its S and T coordinates. As shown in FIG. 4, image plane 430 is an exact copy of source image 410. Image plane 430 is stored in the plane R equals zero of the S, T, and R coordinate system. Image plain 440 is a blurred copy of source image 410. Image plane 440 is store in the plane R equals one of the S, T, and R coordinate system. Image plane 450 is a blurrier copy of source image 410 than is image plane 440. Image plane 450 is stored in the plane R equals two of the S, T, and R coordinate system Successive image planes 460 and 470 are also blurred copies of source image 410. Image plane 460 is stored in the plane R equals three and image plane 470 is stored in the plane R equals four of the S, T, and R coordinate system.

The actual values of R used to identify image planes 430–470 in FIG. 4, (i.e., R equals 0, 1, 2, 3, or 4) are for illustration purposes only. The range of R values available in a particular implementation of the present invention will generally be hardware or software dependant. In a preferred embodiment of the present invention, R is in the range 0–1. In this embodiment, image plane 430 should be stored in the plane R equals 0, and image plane 470 should be stored in the plane R equals 1. Image planes 440–460 of 3D texture volume 420 should be spaced approximately equal-distant between the values 0 and 1. For example, image plane 440 should be stored in the plane R equals 0.25, image plane 450 should be stored in the plane R equals 0.50, and image plane 460 should be stored in the plane R equals 0.75. Storing the image planes of 3D texture volume 420 in a linear manner between the values 0–1 simplifies interpolating a value for a pixel using image planes 430–470 when a pixel having a degree of blurriness different from that of the pixels of image planes 430–470 is required to generate a particular digital image.

Image planes 430–470 each have a respective pixel 415–475 that stores texture data as shown in FIG. 4. Depending on the particular application, pixels 415–475 can contain data other than red, green, and blue color data, and they might not contain red, green, or blue color data.

In an example embodiment of the present invention, image planes 430–470 of 3D texture volume 420 are each generated using source image 410 and one or more box filters. The present invention is not limited to just box filters, however. In this example embodiment, image plane 430 is identical to source image 410. As would be apparent to a person skilled in the relevant art(s), pixel 445 of image plane 440 can be generated by operating on pixel 415 and its neighboring pixels, with a 3×3 box filter:

$$\begin{array}{ccc} [1/9, & 1/9, & 1/9] \\ [1/9, & 1/9, & 1/9] \\ [1/9, & 1/9, & 1/9] \end{array}$$

Applying this 3×3 box filter to the pixels of source image 410 causes image plane 440 to be a blurred version of source image 410. The pixels of images planes 450–470, such as pixels 455–475, can be generated use box filters in a manner similar to that used to generate image plane 440. As would be apparent to a person skilled in the relevant art(s), other types of box filters, e.g., 5×5 and 7×7 box filters, can also be used to generate image planes 440–470 of 3D texture volume 420.

In another embodiment of the present invention, image planes 440–470 of 3D texture volume 420 are generated using source image 410 and Gaussian filters. A Gaussian filter is a filter of the type:

$$\begin{array}{ccc} [1/10, & 1/10, & 1/10] \\ [1/10, & 1/5, & 1/10] \\ [1/10, & 1/10, & 1/10] \end{array}$$

In this embodiment, image planes 440–470 of 3D texture volume 420 are generated in a manner similar to that described about for box filters.

A person skilled in the relevant art(s) will understand, given the description herein, that many other types of filters can be used to generate the image planes of 3D texture volume 420. The particular filter or filters used to generate each image plane of 3D texture volume 420 will dependent upon the spatially varying effects desired. See Gonzalez et al., *Digital Image Processing* (Addison Wesley Publishing Co.: Reading, Mass. 2$^{nd}$ ed. 1987), incorporated in its entirety herein by reference, and Foley et al. for a general discussion of different types of image filters and their applications.

In step 330, a reference image is selected. The pixels of the reference image contain data that can be used as an index to the pixels of a 3D texture volume. The reference image selected in step 330 can reside in any one of several different locations. For example, the selected reference image can reside in memory 230 or in frame buffer 240.

In one example embodiment, the indexing data of the reference image is contained in the red, green, and blue color data of each pixel. In this embodiment, the red color data of each pixel of the reference image contains S coordinate data, the green color data of each pixel contains T coordinate data, and the blue color data of each pixel contains R coordinate data. In this example embodiment, the red, green, and blue color data of each pixel of the reference image can be used to select a particular pixel from a particular 3D texture volume.

A reference image can be created either on the fly by hardware and software or by a user using a Graphics User Interface that allows a user to specify which spatially varying effects are to be incorporated in a particular digital image. A user specified reference image can be pre-processed and stored for later use by an applications program. As further described below with respect to FIG. 5, each pixel of a reference image, whether created on the fly or by a user, can be used as an index to a pixel of a particular 3D texture volume.

Figure 5:
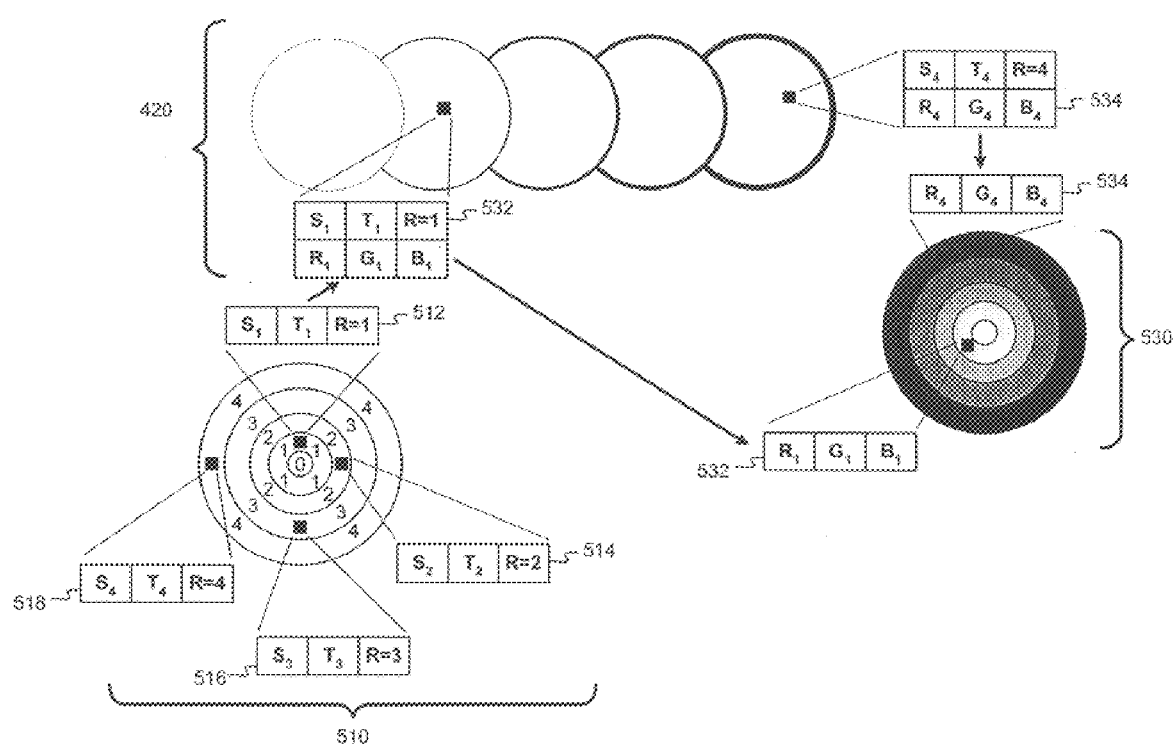
FIG. 5 is a diagram illustrating the relationship between a reference image, a three-dimensional texture volume, and a display image of the present invention.

In step 340, a display image is generated using the reference image selected in step 330 and the 3D texture volume generated in step 320. FIG. 5 illustrates the relationship between a reference image, a 3D texture volume, and a display image.

FIG. 5 is a diagram illustrating the relationship between a reference image 510, 3D texture volume 420, and a display image 530 according to an example of the present invention. As can be seen in FIG. 5, display image 530 represents a sphere generated using pixels selected from 3D texture volume 420. Pixels located near the center of display image 530 are sharp to give an observer the impression that these pixels are located in the focal plane of the image. Pixels located away from the center of display image 530 are blurry to give an observe the impression that these pixels are located behind the focal plane of the image. This depth-of-field technique make a two-dimensional circle appear to an observer as if it were a three-dimensional sphere.

Reference image 510 comprises a plurality of pixels. Pixels 512–518 are representative pixels at different locations to be subjected to varying spatial effects. In an embodiment of the present invention, pixels 512–518 each contain S, T, and R data. According to the present invention, the S, T, and R data in pixels 512–518 are used as an index to select pixels from 3D texture volume 420 for use in generating display image 530. For example, pixel 512 of reference image 510 contains S, T, and R data, which serve as an index to pixel 532 of 3D texture volume 420. The S and T data of pixel 512 are similar to the X and Y location coordinates in a Cartesian coordinate system. The S and T data of each pixel in reference image 510 uniquely locate a particular pixel in an image plane of 3D texture volume 420. The R data of pixel 512 is similar to the Z location coordinated in Cartesian coordinate system. The R data of each pixel in reference image 510 uniquely identifies a particular image plane of 3D texture volume 420. As can be seen best in FIG. 4, an R value equal to zero identifies image plane 430. An R value equal to one identifies image plane 440. An R value equal to two, three, or four respectively identifies image plane 450, 460, or 470 of 3D texture volume 420. In this manner, the S, T, and R data of the pixels of reference image 510 can be used to designate which pixels of 3D texture volume 420 are to be used to generate display image 530.

In an embodiment of the present invention, display image 530 is generated by copying pixels from 3D texture volume 420 directly to frame buffer 240 for display on display 250. In this embodiment, the S, T, and R data of the pixels of reference image 510 are used not only to select which pixels from 3D texture volume 420 are to be used to generate display image 530 but also to determine where the selected pixels from 3D texture volume 420 will be located in frame buffer 240. For example, the S, T, and R data of pixel 512 of reference image 510 is interpreted according to method 300 of the present invention as specifying that pixel 532 of 3D texture volume 420 is to be copied to the frame buffer location that represents pixel 532 of display image 530. Similarly, the S, T, and R data of pixel 518 of reference image 510 is interpreted as specifying that pixel 534 of 3D texture volume 420 is to be copied to the frame buffer location that represents pixel 534 of display image 530. In this embodiment, the remaining pixels of display image 530 are generated in a similar manner using the S, T, and R data of the pixels of reference image 510. As explained below with regard to FIG. 6, there are other ways in which the pixels of 3D texture volume 420 may be used to generate display image 530.

Figure 6:
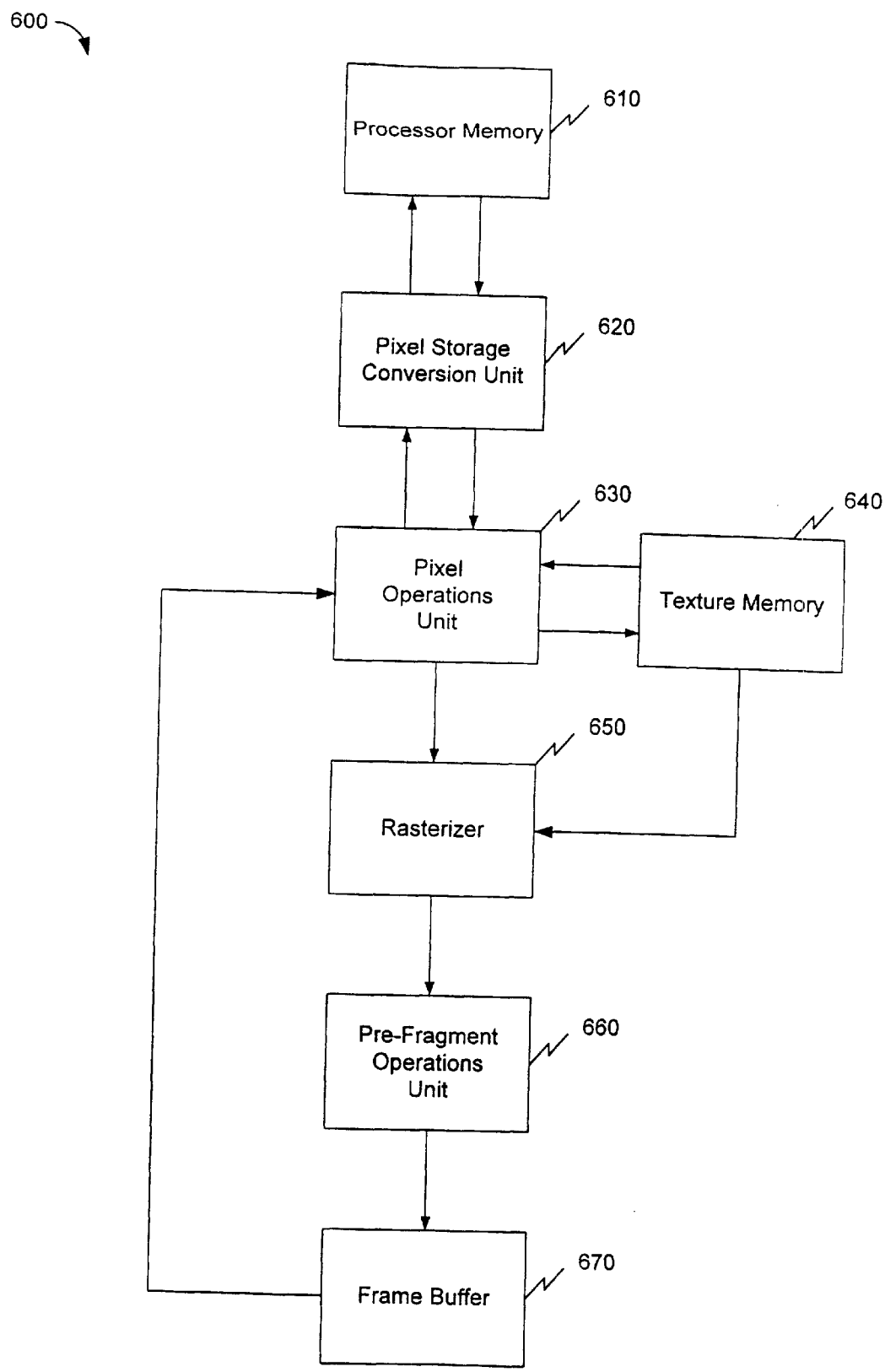
FIG. 6 is a block diagram of an example graphics pipeline that can be used with the present invention.

FIG. 6 is a block diagram of an example graphics pipeline 600 that can be used to implement method 300 of the present invention in an interactive graphics machine. In an embodiment of the present invention, source image 410 and reference image 510 are initially stored in processor memory 610. Source image 410 and reference image 510 may be stored in one of several different storage formats. For example, the images may be stored in a compressed format in order to save storage space or an uncompressed format. The images may also be stored using either integer values or floating-point values.

In an embodiment of the present invention, 3D texture volume 420 is generated by convolving a source image located in frame buffer 670 with predetermined convolution kernels in pixel operation unit 630. The resulting 3D texture volume is then stored in texture memory 640 so that it is available to quickly generate display images having spatially varying effects in an interactive manner. Assuming source image 410 is stored in processor memory 610 in a 20×20×3 array, a 5×20×20×3 texture array can be used to store 3D texture volume 420. This texture array and 3D texture volume 420 can be created using the pseudo-code listed in box 1 below. Alternatively, a 5×10×10×3 texture array could be used to store 3D texture volume 420, and interpolation used to select pixels from 3D texture volume 420 when generating display image 530. When interpolation is used to select or generate pixels using 3D texture volume 420, there is no need to have a one-to-one correspondence between the pixels of reference image 510 and the pixels of 3D texture volume 420, or the pixels of 3D texture volume 420 and the pixels of display image 530, as depicted in FIG. 5.

---

BOX 1

---

1. Initialize a 5 × 20 × 20 × 3 texture array in texture memory 640 to store a 3D texture volume;
2. Read a source image into frame buffer 670;
3. Read the source image from frame buffer 670 into the first image plane of the texture array in texture memory 640;
4. For each subsequent image plane of the texture array in texture memory 640:
   a. Select a predetermined filter or convolution kernel;
   b. Convolve the pixels of the source image located in frame buffer 670 with the selected filter or convolution kernel in pixel operations unit 630
   c. Store the resulting pixels in the appropriate image plane of the texture array in texture memory 640;

---

An advantage of using the pseudo-code listed in box 1 to generate 3D texture volume 420 is that several operations may be performed on the selected source image as the image is transferred from processor memory 610 to frame buffer 670. First, a compressed image will be unpacked by pixel storage conversion unit 620. In pixel operations unit 630, pixel parameters of the selected source image may be checked and altered. For example, the red, green, and blue color data of the pixels may be scaled or biased to produce an image having the desired intensity or luminance value. After the pixels have been operated on in pixel operations unit 630, the pixels are rasterized by rasterizer 650. Normally, each pixel of the selected source image will be mapped to a single display pixel, but it is possible to map each pixel of the selected image to more than one display pixel or to map several image pixels to a single display pixel. After the selected source image is rasterized, pre-fragment operations unit 660 generates any fragments needed to display the selected source image on a display screen or other user interface. The selected image is stored in frame buffer 670 in a data format that is ready for display by the display hardware.

In another embodiment, 3D texture volume 420 is created by a processor from an source image stored in processor memory 610 and then stored in processor memory 610 until needed to generate a display image. When the 3D texture volume is needed to generate a display image, the 3D texture volume is read from processor memory 610 and stored in texture memory 640. This embodiment is particularly useful for interactive computing machines having multiple processors. One processor may be generating a 3D texture volume for subsequent use by a second processor, while the second processor is simultaneously using a earlier generated 3D texture volume to interactively generate a display image having spatially varying effects.

In a manner similar to that described above, display image 530 can be generated by reading an image without spatially varying effects into frame buffer 670 and then copying pixels from the 3D texture volume stored in texture memory 640 to frame buffer 670 in according with the S, T, and R data of a selected reference image. This method results in a display image, which has spatially varying effects and which is stored in the frame buffer ready for display.

In one graphics API implementation, OpenGL™ pixel extension operations (e.g., pixel_texture) can be used to copy pixels having spatially varying effects to frame buffer 670 from a 3D texture volume stored in texture memory 640. In this example embodiment, an image to be modified is first read into a frame buffer 670. Next, pixels from a particular 3D texture volume stored in texture memory 640 are used to replace pixels of the imaged stored in frame buffer 670. The particular pixels from the 3D texture volume that are used to replace pixels of the image stored in frame buffer 670 are selected using a reference image. It should be understood, however, that the present invention is not limited to embodiments that use OpenGL™ pixel extension operations.

In another example embodiment of the invention, rather than just copying over the pixels of the image store in frame buffer 670 with pixels from a 3D texture volume, certain pixels from the 3D texture volume are blended with the pixels of an image store in frame buffer 670. This method of generating a display image is particularly useful for producing motion-blurred object in an image, where the trailing copies of the image can be made to appear as if they are fading.

Example Computer System

Figure 7:
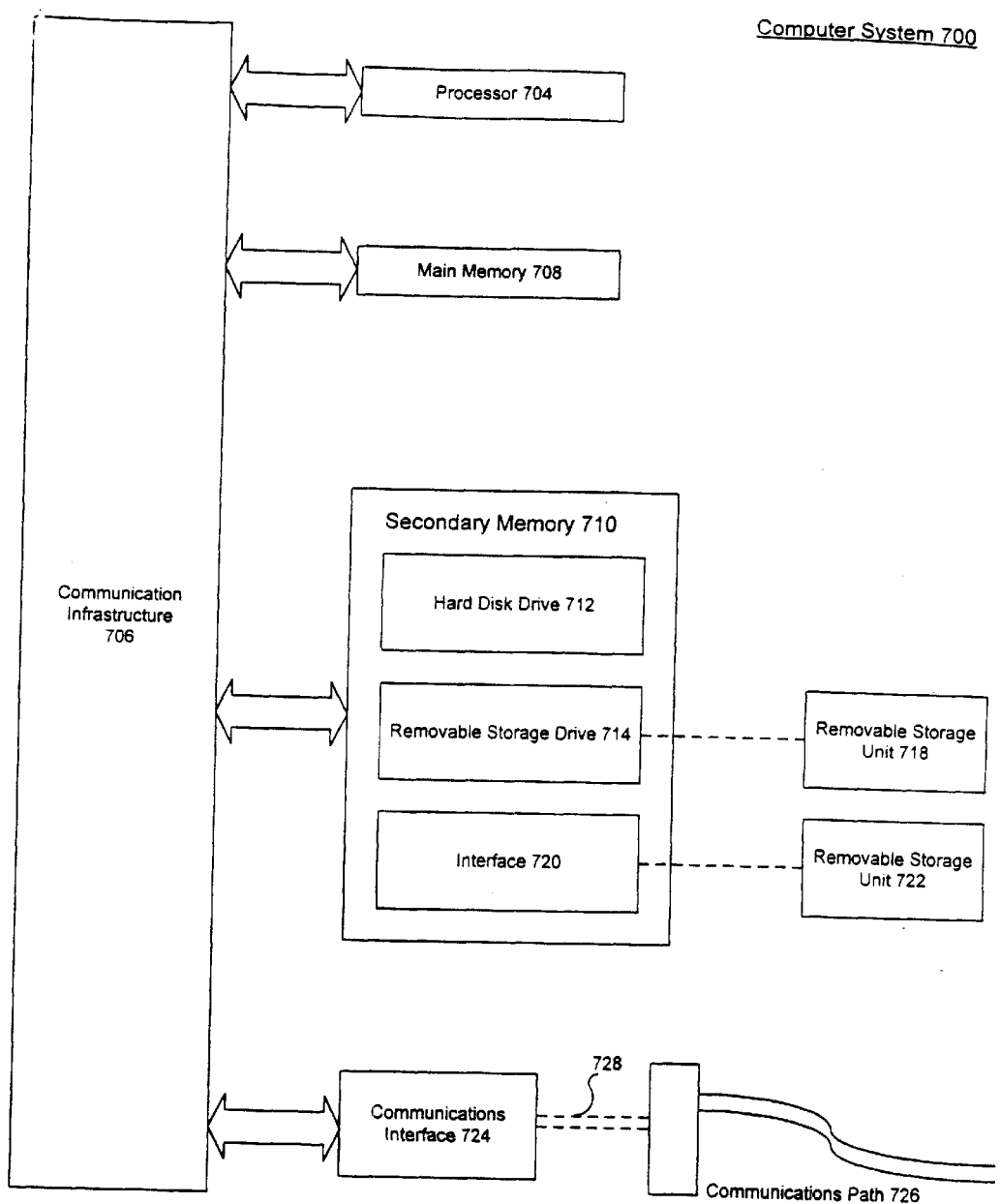
FIG. 7 is an example computer system that can be used to implement the present invention.

Referring to FIG. 7, an example of a computer system 700 is shown, which can be used to implement one embodiment of the present invention. This example computer system is illustrative and not intended to limit the present invention. Computer system 700 represents any single or multiprocessor computer. Single-threaded and multi-threaded computers can be used. Unified or distributed memory systems can be used.

Computer system 700 includes one or more processors, such as processor 704. One or more processors 704 can execute software and implement all or part of the features of the present invention described herein. Each processor 704 is connected to a communication infrastructure 702 (e.g., a communications bus, cross-bar, or network). After reading this description, it will become apparent to a person skilled in the relevant art how to implement the invention using other computer systems and/or computer architectures.

Computer system 700 also includes a main memory 708, preferably random access memory (RAM), and can also include secondary memory 710. Secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc., which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means can include, for example, a removable storage unit 722 and an interface 720. Examples can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices via communications path 726. Examples of communications interface 724 can include a modem, a network interface (such as Ethernet card), a communications port, etc. Software and data transferred via communications interface 724 are in the form of signals which can be electronic, electromagnetic, optical or other signals capable of being received by communications interface 724, via communications path 726. Note that communications interface 724 provides a means by which computer system 700 can interface to a network such as the Internet.

The present invention can be implemented using software running (that is, executing) in an environment similar to that described above with respect to FIG. 7. In this document, the term "computer program product" is used to generally refer to removable storage unit 718, a hard disk installed in hard disk drive 712, or a carrier wave or other signal carrying software over a communication path 726 (wireless link or cable) to communication interface 724. A computer useable medium can include magnetic media, optical media, or other recordable media, or media that transmits a carrier wave. These computer program products are means for providing software to computer system 700.

Computer programs (also called computer control logic) are stored in main memory 708 and/or secondary memory 710. Computer programs can also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. Alternatively, the computer program product may be downloaded to computer system 700 over communications path 726. The control logic (software), when executed by the one or more processors 704, causes the processor(s) 704 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Various embodiments of the present invention have been described above, which are independent of image complexity and are capable of being implemented on an interactive graphics machine. It should be understood that these embodiments have been presented by way of example only, and not limitation. It will be understood by those skilled in the relevant art(s) that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for generating a digital image having spatially varying effects, comprising the steps of:

selecting a source image having a plurality of pixels;

generating a three-dimensional texture volume having spatially varying effects using said source image, said three-dimensional texture volume having a plurality of pixels, said three-dimensional texture volume comprising two or more image planes, said two or more image planes and said source image each being of equal dimensions;

selecting a reference image having a plurality of pixels, wherein each of said plurality of pixels of said reference image acts as an index to said plurality of pixels of said three-dimensional texture volume; and generating a display image having spatially varying effects using said reference image and said three-dimensional texture volume.

2. The method of claim 1, wherein the step of generating a three-dimensional texture volume comprises the step of:

generating a first image plane of said three-dimensional texture volume by convolving said plurality of pixels of said source image with a first convolution kernel, said first image plane having a plurality of pixels.

3. The method of claim 2, wherein the step of generating a display image comprises the step of:

copying a set of said plurality of pixels of said three-dimensional texture volume to a frame buffer, said set of said plurality of pixels of said three-dimensional texture volume comprising at least one of said plurality of pixels of said three-dimensional texture volume.

4. The method of claim 2, wherein the step of generating a display image comprises the step of:

blending a first set of said plurality of pixels of said three-dimensional texture volume, said first set of said plurality of pixels of said three-dimensional texture volume comprising at least one of said plurality of pixels of said three-dimensional texture volume, with a second set of a plurality of pixels of an image already stored in a frame buffer, said second set of said plurality of pixels of said image comprising at least one of said plurality of pixels of said image.

5. The method of claim 2, wherein the step of generating a first image plane of said three-dimensional texture volume comprises the step of:

convolving said plurality of pixels of said source image with a box-type filter.

6. The method of claim 2, wherein the step of generating a first image plane of said three-dimensional texture volume comprises the step of:

convolving said plurality of pixels of said source image with a Gaussian-type filter.

7. The method of claim 2, wherein the step of generating a three-dimensional texture volume further comprises the step of:

generating a second image plane of said three-dimensional texture volume by convolving said plurality of pixels of said source image with a second convolution kernel.

8. The method of claim 2, wherein the step of generating a second image plane of said three-dimensional texture volume comprises the step of:

convolving said plurality of pixels of said first image plane of said three-dimensional texture volume with a second convolution kernel to generate a second image plane of said three-dimensional texture volume.

9. The method of claim 1, wherein the step of selecting a reference image comprises the steps of:

rendering an image containing indexing data into a frame buffer using an application program; and selecting said image as the reference image.

10. The method of claim 9, wherein the step of rendering an image containing indexing data into a frame buffer comprises the steps of:

rendering a image containing depth-of-field data into a frame buffer using an application program.

11. The method of claim 9, wherein the step of rendering an image containing indexing data into a frame buffer comprises the steps of:

rendering a image containing motion-blur data into a frame buffer using an application program.

12. The method of claim 1, wherein the step of generating a display image comprises the steps of:

selecting a first pixel from a first image plane of said three-dimensional texture volume and a second pixel from a second image plane of said three-dimensional texture volume;

interpolating said first and second pixels to produce a third pixel; and incorporating said third pixel into said display image.

13. The method of claim 1, wherein the step of generating a display image comprises the steps of:

selecting a first and a second pixel from an image plane of said three-dimensional texture volume;

interpolating said first and second pixels to produce a third pixel; and incorporating said third pixel into said display image.

14. A system for generating a digital image having spatially varying effects, comprising:

means for selecting a source image having a plurality of pixels;

means for generating a three-dimensional texture volume having spatially varying effects using said source image, said three-dimensional texture volume having a plurality of pixels, said three-dimensional texture volume comprising two or more image planes, said two or more image planes and said source image each being of equal dimensions;

means for selecting a reference image having a plurality of pixels, wherein each of said plurality of pixels of said reference image acts as an index to said plurality of pixels of said three-dimensional texture volume; and means for generating a display image having spatially varying effects using said reference image and said three-dimensional texture volume.

15. The system of claim 14, further comprising:

means for interpolating a first and a second pixel of the three-dimensional texture volume to produce a third pixel for use in generating the display image.

16. The system of claim 14, wherein an image plane of said three-dimensional texture volume is generated by convolving said plurality of pixels of said source image with a convolution kernel.

17. The system of claim 16, wherein said convolution kernel is a box-type filter.

18. A computer program product comprising a computer useable medium having computer program logic recorded thereon for enabling a processor to generate a digital image having spatially varying effects, said computer program logic comprising:

means that enables the processor to generate a three-dimensional texture volume having spatially varying effects using a source image, said three-dimensional texture volume having a plurality of pixels; and means that enables the processor to generate a display image having spatially varying effects using a reference image and the three-dimensional texture volume.

19. The computer program product of claim 18, further comprising:

means that enables the processor to interpolate a first and a second pixel of the three-dimensional texture volume to produce a third pixel for use in generating the display image.

20. A system, comprising:

a texture memory;

a processor that generates a three-dimensional texture volume having spatially varying effects representative of a source image at multiple levels of blurriness and stores said three-dimensional texture volume in memory, said three-dimensional texture volume comprising two or more image planes, where each of said image planes is of equal dimensions; and a graphics pipeline that generates a display image having spatially varying effects using a reference image and said three-dimensional texture volume stored in said texture memory.

* * * * *

UNITED STATES PATENT AND TRADEMARK OFFICE
CERTIFICATE OF CORRECTION

PATENT NO.    : 6,587,114 B1                                         Page 1 of 1
DATED         : July 1, 2003
INVENTOR(S)   : Peercy et al.

It is certified that error appears in the above-identified patent and that said Letters Patent is hereby corrected as shown below:

Column 1,
Line 34, please delete "motion-burring" and insert therefore -- motion-blurring --;

Signed and Sealed this

Twenty-eighth Day of October, 2003

JAMES E. ROGAN
*Director of the United States Patent and Trademark Office*